(12) United States Patent
Cabello et al.

(10) Patent No.: US 12,737,950 B2
(45) Date of Patent: Sep. 15, 2026

(54) SYSTEMS AND METHODS FOR SUPER TIME-OF-FLIGHT RESOLUTION

(71) Applicant: Siemens Medical Solutions USA, Inc., Malvern, PA (US)

(72) Inventors: Jorge Cabello, Lenoir City, TN (US); Maurizio Conti, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 72 days.

(21) Appl. No.: 18/707,969

(22) PCT Filed: May 12, 2022

(86) PCT No.: PCT/US2022/072275
§ 371 (c)(1),
(2) Date: May 7, 2024

(87) PCT Pub. No.: WO2023/219650
PCT Pub. Date: Nov. 16, 2023

(65) Prior Publication Data

US 2025/0299389 A1 Sep. 25, 2025

(51) Int. Cl.
*G06T 12/20* (2026.01)
*G06T 3/4046* (2024.01)
*G06T 3/4053* (2024.01)

(52) U.S. Cl.
CPC ............ *G06T 12/20* (2026.01); *G06T 3/4046* (2013.01); *G06T 3/4053* (2013.01); *G06T 2211/441* (2023.08)

(58) Field of Classification Search
CPC .................................................... G06T 11/006
See application file for complete search history.

(56) References Cited

U.S. PATENT DOCUMENTS

| | | | |
|---|---|---|---|
| 8,000,513 | B2 | 8/2011 | Defrise et al. |
| 8,110,805 | B2 | 2/2012 | Panin |
| 9,990,741 | B2 | 6/2018 | Panin |
| 11,164,344 | B2 | 11/2021 | Whiteley et al. |
| 2015/0297168 | A1 | 10/2015 | Panin |
| 2018/0293762 | A1 | 10/2018 | Fu et al. |

(Continued)

OTHER PUBLICATIONS

William Whiteley et al., FastPET: Near Real-Time Reconstruction of PET Histo-Image Data Using a Neural Network, IEEE Transactions On Radiation and Plasma Medical Sciences, 5(1): 65-77, 2021 (Year: 2021).*

(Continued)

*Primary Examiner* — Shivang I Patel

(57) ABSTRACT

Systems and methods of generating improved resolution histo-images are disclosed. A system includes a positron emission tomography (PET) imaging modality configured to execute a first scan to acquire a first PET dataset and a processor configured to back-project the first PET dataset to generate a first histo-image having a first resolution, input the first histo-image to a trained neural network, receive a second histo-image from the trained neural network, and input the second histo-image to a reconstruction process configured to generate a reconstructed PET image. The second histo-image has a second resolution higher than the first resolution. The second histo-image represents the first PET dataset.

20 Claims, 10 Drawing Sheets

(56) References Cited

U.S. PATENT DOCUMENTS

2020/0051260 A1 2/2020 Shen et al.
2021/0104079 A1* 4/2021 Whiteley .............. G06T 11/005

OTHER PUBLICATIONS

FastPET (Year: 2021).*
William Whitley et al., "FastPET: Near Real-Time Reconstruction of PET Histo-Image Data Using a Neural Network", IEEE Transactions on Radiation and Plasma Medical Sciences, vol. 5, No. 1, Jan. 1, 2021, pp. 65-77.
Li Yusheng et al: "DeepDIRECT: Deep Direct Image Reconstruction from Multi-View TOF PET Histoimages using Convolutional LSTM" , 16th International Meeting On Fully 3D Image Reconstruction in Radiology and Nuclear Medicine, Jul. 19, 2021 (Jul. 19, 2021), pp. 111-115.
International Search Report for Corresponding PCT Application No. PCT/US2022/072275, mailed Jan. 26, 2023.
Ota, Ryosuke, et al. "Direct positron emission imaging: ultra-fast timing enables reconstruction-free imaging." arXiv preprint arXiv:2105.05805 (2021).
Joseph, Peter et al. "An Improved Algorithm for Reprojecting Rays Through Pixel Images"; IEEE Transactions on Medical Imaging IEEE, USA, vol. MI-1, No. 3, Nov. 1, 1982 (Nov, 1, 1982), pp. 192-196.
Matej, Samuel et al. "Efficient 3-D TOF PET Reconstruction Using View-Grouped Histo-Images: DIRECT-Direct Image Reconstruction for TOF", IEEE Transactions On Medical Imaging IEEE, USA, vol. 28, No. 5, May 1, 2009 (May 1, 2009), pp. 739-751.

* cited by examiner

SYSTEMS AND METHODS FOR SUPER TIME-OF-FLIGHT RESOLUTION

BACKGROUND

According to conventional Positron Emission Tomography (PET) imaging, a tracer compound including a radionuclide is introduced into a patient body by injection, inhalation, or ingestion. Radioactive decay of the radionuclide generates positrons, which eventually encounter electrons and are annihilated thereby. The annihilation event produces two gamma photons that travel in approximately opposite directions. Accordingly, an annihilation event is identified when two detectors disposed on opposite sides of the patient body detect the arrival of two oppositely-travelling gamma photons within a particular coincidence time window.

Because the two gamma photons travel in approximately opposite directions, the locations of the two detectors determine a Line-of-Response (LOR) along which the annihilation event occurred. Time-of-flight (TOF) PET measures the difference between the detection times of the two gamma photons arising from the annihilation event. This difference can be used to estimate a particular position along the LOR at which the annihilation event occurred. The resolution of a PET scanner can be defined based on the time resolution of the difference between the detection times, and is commonly measured in the range of picoseconds (ps).

Although the resolution of PET scanners has improved over time, current low-cost systems can provide a response time resolution of only about 600 ps, while more expensive systems can provide higher resolution, such as 200 ps. Although PET scanners having response times of 10 ps have been discussed, such scanners are currently still theoretical. Improvements in response time resolution lead directly to improved images and data, providing better clinical outcomes.

SUMMARY

In various embodiments, a system is disclosed. The system includes a PET imaging modality configured to execute a first scan to acquire a first PET dataset and a processor configured to back-project the first PET dataset to generate a first histo-image having a first resolution, input the first histo-image to a trained neural network, receive a second histo-image from the trained neural network, and input the second histo-image to a reconstruction process configured to generate a reconstructed PET image. The second histo-image is an improved version of the first histo-image having a second resolution that is better than the first resolution.

In various embodiments, a method of generating reconstructed positron emission tomography (PET) images is disclosed. The method includes steps of executing a first scan to acquire a first PET dataset, back-projecting the first PET dataset to generate a first histo-image having a first resolution, inputting the first histo-image to a trained neural network, receiving a second histo-image from the trained neural network, and inputting the second histo-image to a reconstruction process configured to generate a reconstructed PET image. The second histo-image is an improved version of the first histo-image having a second resolution that is better than the first resolution.

In various embodiments, a method of training a neural network to generate improved-resolution histo-images is disclosed. The method includes a step of receiving a training dataset comprising a first plurality of histo-images having a first resolution and a second plurality of histo-images having a second resolution. Each of the histo-images in the first plurality of histo-images has at least one corresponding histo-image in the second plurality of histo-images. The second resolution of each histo-image in the second plurality of histo-images is better than the first resolution of the corresponding histo-image in the first plurality of histo-images. The method further includes steps of inputting each histo-image in the first plurality of histo-images to a neural network configured to generate an improved-resolution histo-image having an estimated second resolution and modifying the neural network based on differences between each improved-resolution histo-image and a histo-image in the second plurality of histo-images that correspond to the histo-image in the first plurality of histo-images provided to the neural network.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
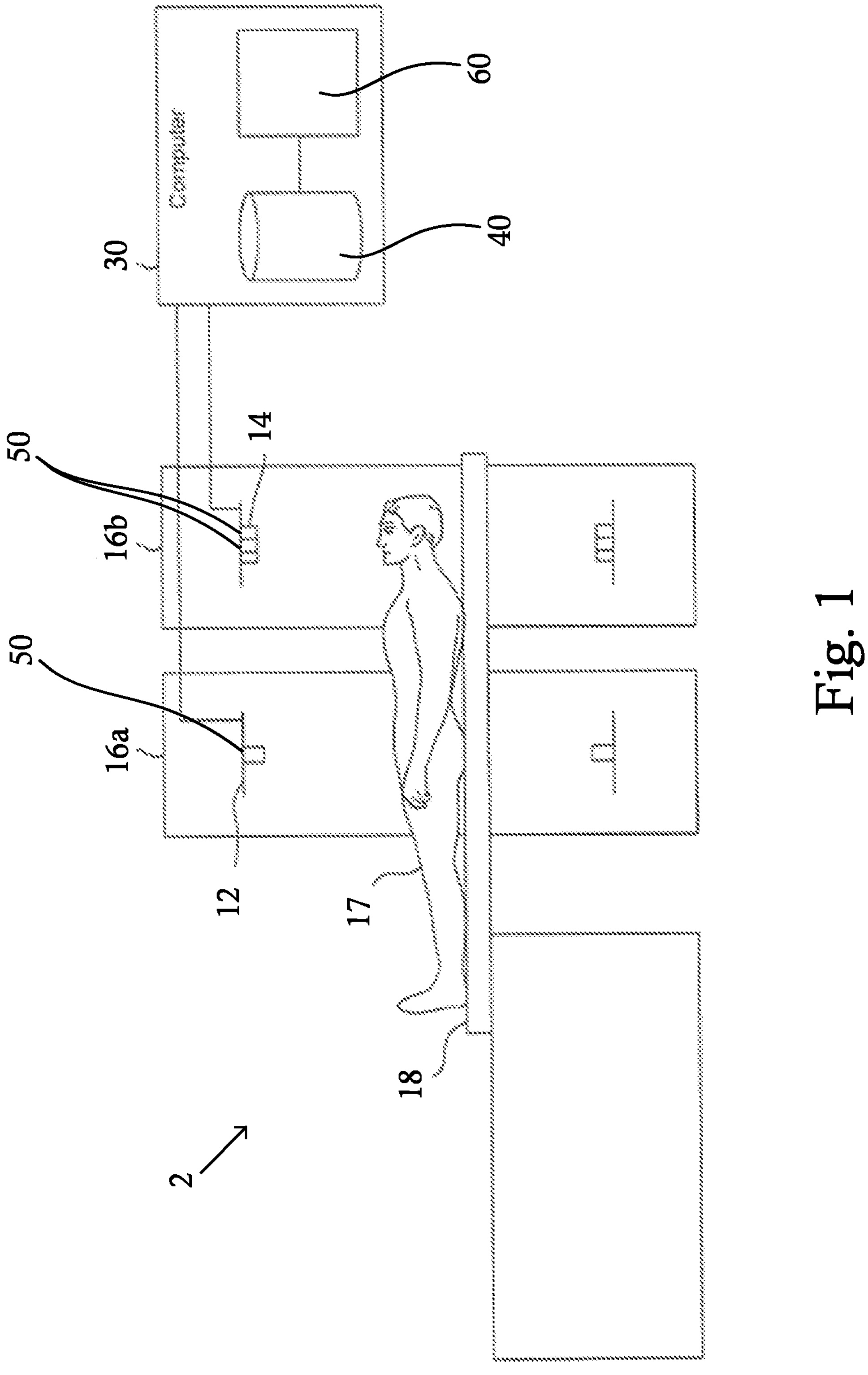
FIG. 1 illustrates a nuclear imaging system, in accordance with some embodiments.

This description of the exemplary embodiments is intended to be read in connection with the accompanying drawings, which are to be considered part of the entire written description.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating improved-resolution PET images using data obtained by PET scanners having a poorer response time resolution and a trained neural network as well as with respect to methods and systems for training a neural network to generate improved-resolution histo-images from lower resolution histo-images. Features, advantages or alternative embodiments herein can be assigned to the other claimed objects and vice versa. In other words, claims for methods and systems for training a neural network to generate high-resolution histo-images from lower resolution PET data can be improved with features described or claimed in context of the methods and systems for generating improved-resolution PET images using data obtained by lower resolution PET scanners and a trained neural network, and vice versa.

As used herein, the term "histo-image" is used to refer to data representations of PET data in image-space and a histo-image that represents the PET data is a data representation of the specific PET data in the image-space. In addition, as used herein, an "improved histo-image" refers to an improved version of the histo-image in image space which represents an improved version of the specific PET data (i.e., mimics the PET data as if it had been obtained at a better resolution). Although embodiments are illustrated including visual representations of histo-images, it will be appreciated that such visual representations are representative of the data structures that are generated and used by the various components of the systems and methods disclosed herein. Operations performed on or including histo-images disclosed herein can be performed on the underlying data of the data representation without conversion of the data to a visual format. References to improvement in resolution or quality of an image should be read to include improvements to the underlying data resolution of the data representation.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, a convolutional deep neural network, an adversarial neural network, a generative adversarial network (GAN), a deep adversarial neural network, and/or any other suitable neural network known or later developed.

In various embodiments, a neural network which improves resolution of an input histo-image to simulate an increased resolution scan, is disclosed. The trained neural network is configured to receive a histo-image having a first resolution and generate an output histo-image having a simulated improved resolution. The improved resolution histo-images can be used for clinical analysis and/or as input to additional methods for reconstruction and/or analyzing PET image data. In various embodiments, a trained neural network can be configured to increase resolution of a low-resolution scan, for example, from 600 ps to 200 ps and/or increase resolution of a high-resolution scan to an even higher resolution, for example, from 200 ps to 10 ps. In some embodiments, the trained neural network is configured to generate histo-images having an effective resolution better than that currently obtainable using clinically deployed equipment.

FIG. 1 illustrates one embodiment of a nuclear imaging system 2, in accordance with some embodiments. The nuclear imaging system 2 includes a scanner for at least a first modality 12 provided in a first gantry 16*a*. The first modality 12 can include any suitable imaging modality, such as a positron emission tomography (PET) modality. A patient 17 lies on a movable patient bed 18 that can be movable within a gantry 19. In some embodiments, the nuclear imaging system 2 includes a scanner for a second imaging modality 14 provided in a second gantry 16*b*. The second imaging modality 14 can be any suitable imaging modality, such as, for example, PET modality, a SPECT modality, a CT modality, magnetic resonance (MR) modality, and/or any other suitable imaging modality. Each of the first modality 12 and/or the second modality 14 can include one or more detectors 50 configured to detect an annihilation photon, gamma ray, and/or other nuclear imaging event. In some embodiments, one or more of the detectors 50 generate background radiation data during a scan.

Scan data from the first modality 12 and/or the second modality 14 is stored at one or more computer databases 40 and processed by one or more computer processors 60 of a computer system 30. The graphical depiction of computer system 30 in FIG. 1 is provided by way of illustration only, and computer system 30 can include one or more separate computing devices. The nuclear imaging data sets can be provided by the first modality 12, the second modality 14, and/or can be provided as a separate data set, such as, for example, from a memory coupled to the computer system 30. The computer system 30 can include one or more processing electronics for processing a signal received from one of the plurality of detectors 50. In some embodiments, the scan data includes background radiation-based attenuation. The computer system 30 can use one or more background radiation based attenuation maps during image reconstruction to correct for background radiation attenuation.

In some embodiments, the computer system 30 is configured to generate reconstructed PET images using improved-resolution histo-images having a higher effective resolution than the resolution of the first modality 12 (e.g., the PET scanning modality). The improved-resolution histo-images are generated by a neural network implemented by the processor 60 that is configured to generate a histo-image having a higher effective resolution than the first modality 12 is otherwise capable of producing. In some embodiments, the computer system 30 is configured to generate the improved-resolution histo-images and store the improved-resolution histo-images in a computer database 40 for later use in PET image reconstruction and/or training of additional or revised neural networks.

Figure 2:
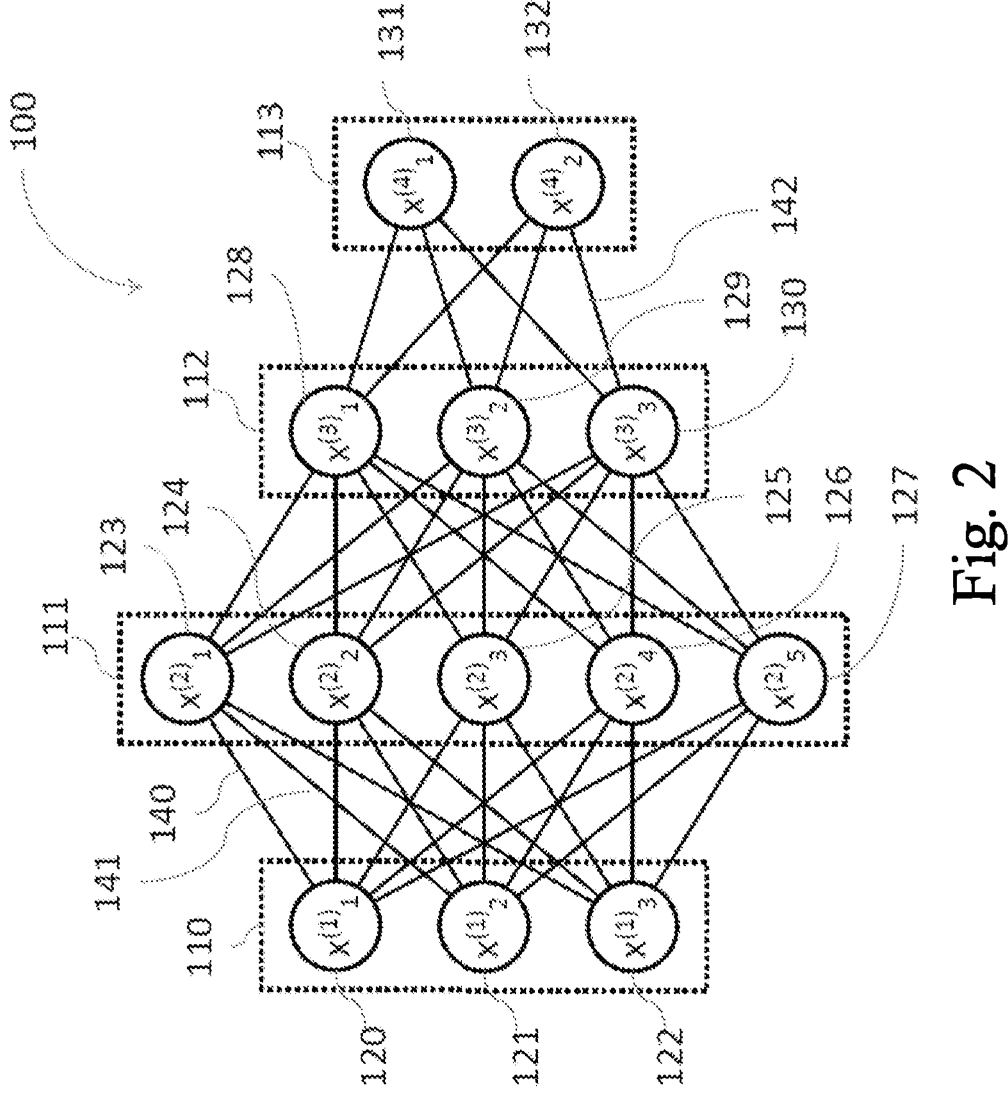
FIG. 2 illustrates an embodiment of an artificial neural network, in accordance with some embodiments.

FIG. 2 displays an embodiment of an artificial neural network 100. Alternative terms for "artificial neural network" are "neural network," "artificial neural net," "neural net," or "trained function." FIG. 2 is provided as an example of an artificial neural network 100 and the structure disclosed therein is not limiting with respect to the disclosure. The artificial neural network 100 comprises nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 2 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "outgoing edge" for the first node 120-132.

In this embodiment, the nodes 120-132 of the artificial neural network 100 can be arranged in layers 110-113, wherein the layers can comprise an intrinsic order introduced by the edges 140-142 between the nodes 120-132. In particular, edges 140-142 can exist only between neighboring layers of nodes. In the displayed embodiment, there is an input layer 110 comprising only nodes 120-122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120-122 within the input layer 110 usually relates to the number of input values of the neural network, and the number of nodes 131, 132 within the output layer 113 usually relates to the number of output values of the neural network.

In particular, a (real) number can be assigned as a value to every node 120-132 of the neural network 100. Here, $x^{(n)}$; denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can comprise a weight being a real number, in particular, the weight is a real number within the interval [−1, 1] or within the interval [0, 1]. Here, $w^{(m,n)}{}_{i,j}$ denotes the weight of the edge between the i-th node 120-132 of the m-th layer 110-113 and the j-th node 120-132 of the n-th layer 110-113. Furthermore, the abbreviation $w^{(n)}{}_{i,j}$ is defined for the weight $w^{(m,n+1)}{}_{i,j}$.

In particular, to calculate the output values of the neural network 100, the input values are propagated through the neural network. In particular, the values of the nodes 120-132 of the (n+1)-th layer 110-113 can be calculated based on the values of the nodes 120-132 of the n-th layer 110-113 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g. the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values $w^{(m,n)}{}_{i,j}$ for the edges, the neural network 100 has to be trained using training data. In particular, training data comprises training input data and training output data (denoted as $t_i$). For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein γ is a learning rate, and the numbers $\delta^{(n)}{}_j$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta^{(n+1)}{}_j$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 113, wherein ffx is the first derivative of the activation function, and $y^{(n+1)}{}_j$ is the comparison training value for the j-th node of the output layer 113.

In some embodiments, the neural network 100 is configured, or trained, to generate improved-resolution histo-images. For example, in some embodiments, the neural network 100 is configured to receive a histo-image generated from TOF PET data obtained at a first response time resolution. The neural network 100 can receive the histo-images in any suitable form, such as, for example, as list-mode or sinogram PET data (in which case the neural network 100 includes one or more layers configured to generate a histo-image), pre-generated data representations in image space (e.g., pre-generated histo-images), etc.). The neural network 100 is trained to generate an improve-resolution histo-image having an effective second response time resolution that is higher (e.g., faster) than the first response time resolution.

Figure 3:
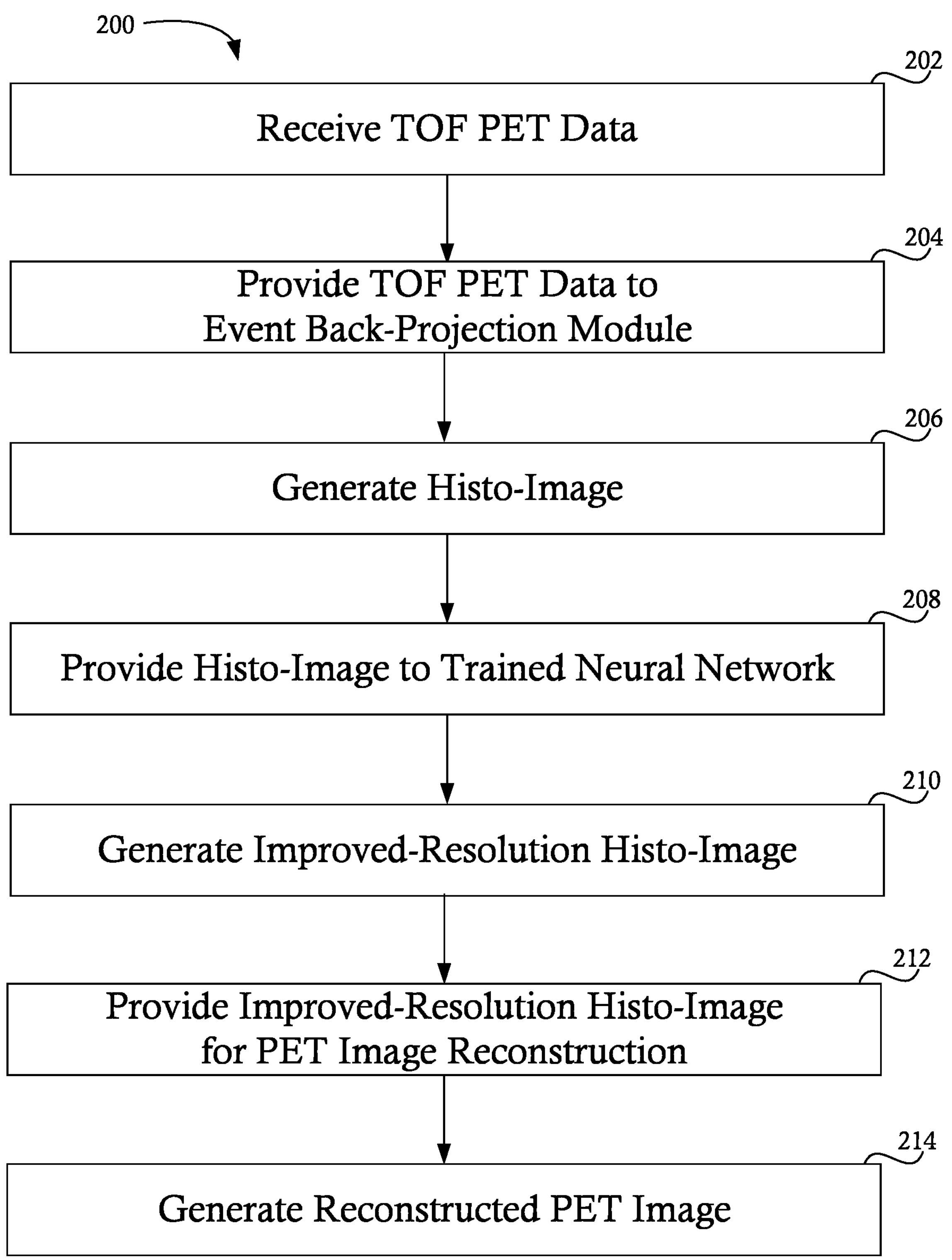
FIG. 3 is a flowchart illustrating a method of generating a reconstructed PET image using an improved-resolution histo-image, in accordance with some embodiments.
Figure 4:
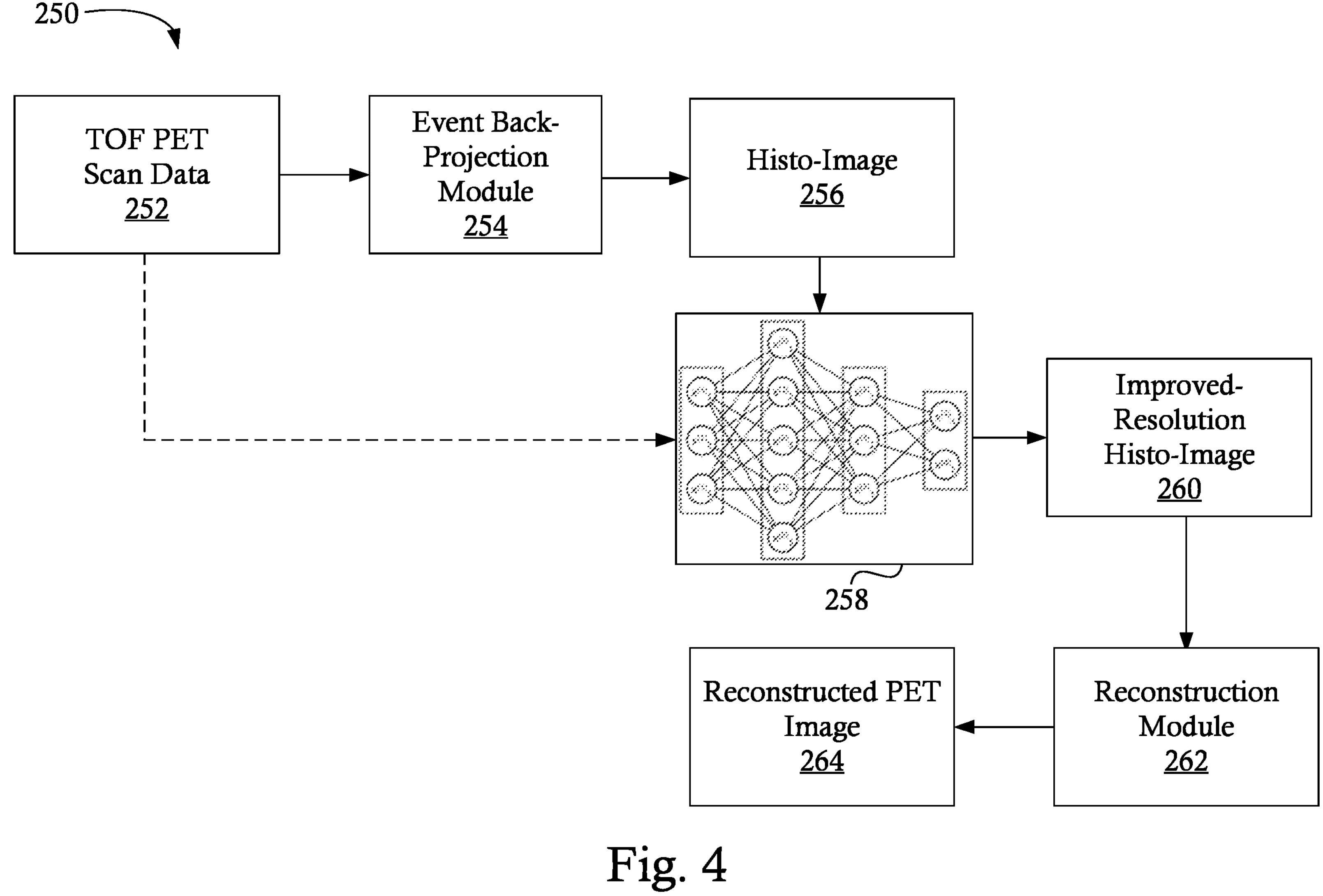
FIG. 4 is a block diagram illustrating a system configured to implement various portions of the method illustrated in FIG. 3, in accordance with some embodiments.

FIG. 3 is a flowchart 200 illustrating a method of generating a reconstructed PET image using an increased-resolution histo-image, in accordance with some embodiments. FIG. 4 is a block diagram illustrating a system 250 configured to implement various portions of the method illustrated in FIG. 3, in accordance with some embodiments. The method of generating a reconstructed PET image using an increased-resolution histo-image is discussed with reference to FIGS. 3 and 4.

At step 202, nuclear imaging data, and specifically TOF PET data 252, is obtained from a scanning modality, such as a first modality 12. TOF PET data 252 is obtained over a predetermined time period and at a first response time resolution. The TOF PET data 252 is acquired as is known in the art. For example, TOF sinograms and/or TOF list-mode data can be acquired and/or generated by a PET scanner (e.g., imaging modality 12 and computer 30) after injection of a radioactive tracer into a subject volume (e.g., a patient, animal, or phantom). The TOF PET data 252, such as specific TOF sinograms and/or specific portions of the TOF list-mode data, correspond to a respective axial location of the subject volume over which coincident annihilation events within the volume were detected. The TOF PET data 252 includes the location of a line or response (LOR) of each coincidence event.

The TOF PET data 252 may be obtained in a list-mode format and/or may be converted into a plurality of sinograms. List-mode data includes the coordinates of each detected coincidence event during an image acquisition period. A sinogram includes a data array of an angle versus a displacement of each LOR within a specific time period at a specific axial position of the subject volume. Each TOF sinogram includes one row containing the LOR for a particular azimuthal angle q. Each of these rows corresponds to a one-dimensional parallel projection of the tracer compound distribution at a different coordinate.

At step 204, the TOF PET data 252 is provided to an event back-projection module 254 and, at step 206, the event back-projection module 254 applies a back-projection algorithm to the TOF PET data 252 to generate a histo-image 256. The generated histo-image 256 includes a blurred image (e.g., data representation) of the expected distribution along a particular TOF direction of the subject volume. The event back-projection module 254 may be configured to apply any suitable back-projection algorithm, for example, as determined by the format of the received TOF PET data 252, e.g., sinogram or list-mode data.

For example, when the TOF PET data 252 includes sinograms, the event back-projection module 254 may apply Joseph's method (P. M. Joseph, "An improved algorithm for reprojecting rays through pixel images," *IEEE Transactions on Medical Imaging*, vol. 1 no. 3, pp. 192-196, November 1982, which is incorporated herein by reference in its entirety) to generate the histo-image 256. As another example, when the TOF PET data 252 includes list-mode data, the event back-projection module 254 may assign events within a predetermined time frame and/or range to an image voxel along a LOR, according to its timing information within the predetermined range. Histo-images generated by back-projecting list-mode data can be more accurate than histo-images generated by back-projecting sinograms generated from list-mode data as the list-mode data may exhibit higher-resolution timing data than TOF sinogram data generated therefrom.

In some embodiments, the TOF PET data 252, whether in sinogram or list-mode form, may be corrected using attenuation correction and/or normalization factors before back-projecting to obtain a modified histo-image 256. In such cases, the modified histo-image 256 is provided as input to the trained neural network 258, as discussed below.

The histo-image 256 generated by the back-projection module is generated at the first response time resolution. The first response time resolution is determined by the parameters of the first modality 12 and the associated scan parameters used to obtain the TOF PET data 252. In some embodiments, the first response time resolution is about 600 ps, such as, for example, 550 ps. A histo-image 256 having a resolution of above about 350 ps (e.g., 550 ps, 600 ps, etc.) is referred to herein as a "low-resolution" image. In some embodiments, the first resolution is about 200 ps, such as, for example, 215 ps. A histo-image 256 having a resolution of about 100 ps to about 350 ps (e.g., 200 ps, 215 ps, etc.) is referred to herein as a "high-resolution" image. Although specific ranges are given herein, it will be appreciated that the disclosed systems and methods may be used to improve the resolution of any histo-image from a first resolution to a second, higher resolution, and is within the scope of this disclosure.

At step 208, the histo-image 256 having the first response time resolution is provided to a trained neural network 258. As discussed in greater detail below, the trained neural network 258 is generated through an iterative training process using a training data set including a first set of histo-images having a first response time resolution and a second set of associated histo-images having a second, higher (e.g., faster) response time resolution. The trained neural network 258 is configured to receive a histo-image 256 having a first resolution and generate an improved-resolution histo-image 260.

At step 210, the trained neural network 258 generates an improved-resolution histo-image 260 having an effective second response time resolution higher than otherwise possible based on the scan parameters and imaging modality used to obtain the TOF PET data 252. The effective second response time resolution of the improved-resolution histo-image 260 is higher (i.e., faster or better) than the first response time resolution of the histo-image 256 generated by the event back-projection module 254. For example, in embodiments including a low-resolution generated histo-image 256 (e.g., having a first resolution of about 550 ps, about 600 ps, etc.), the improved-resolution histo-image 260 can have an effective high resolution (e.g., resolution of about 200 ps, 215 ps, etc.). Similarly, in embodiments including a high-resolution generated histo-image 256 (e.g., having a first resolution of about 200 ps, about 215 ps, etc.), the improved-resolution histo-image 260 can have a "super-high" resolution (e.g., having a resolution of about 100 ps or better, such as, for example, about 10 ps, about 1 ps, etc.). In some embodiments, the improved-resolution histo-image 260 has a higher resolution than otherwise possible based on the scan parameters and imaging modality used to obtain the TOF PET data 252 (for example, providing an effective time response resolution of 10 ps, which is not possible on current systems). Although specific embodiments and ranges are discussed herein, it will be appreciated that, in general, the trained neural network 258 can be any neural network configured to generate an improved-resolution histo-image that has a higher effective response-time resolution as compared to the response time resolution of an input histo-image.

At step 212, the improved-resolution histo-image 260 is provided to a PET image reconstruction module 262 configured to generate a reconstructed PET image 264 from the improved-resolution histo-image 260. The image reconstruction module 262 can be configured to implement any suitable image reconstruction process, such as conventional methods and/or methods utilizing trained neural networks. For example, in some embodiments, the PET image reconstruction module 262 can be configured to implement a conventional reconstruction process (e.g., algorithm) such as a filtered back-projection algorithm (e.g., 2D or 3D), a maximum-likelihood expectation maximization algorithm (MLEM), an ordered subset expectation maximization algorithm (OSEM), a maximum likelihood estimation of activity and attenuation (MLAA) algorithm, any other iterative and/or analytical method, and/or any other suitable conventional reconstruction method known or later developed. As another example, in some embodiments, alternatively and/or in addition to a "conventional" reconstruction method, the PET image reconstruction module 262 can be configured to implement a trained neural network for generating a reconstructed PET image, such as, for example, a novel deep learning or neural network based method. For example, as disclosed in U.S. Pat. No. 11,164,344, entitled "PET image reconstruction using TOF data and neural network," issued on Nov. 2, 2021 and William Whitley, et al., "FastPET: Near Real-Time Reconstruction of PET Histo-Image Data Using a Neural Network", IEEE Transactions on Radiation and Plasma Medical Sciences, vol. 5, no. 1, January 2021, each of which are incorporated herein by reference in their respective entireties, each disclose a deep learning or neural network based reconstruction method. The reconstructed PET image may be used for clinical and/or other purposes, as is known in the art. Due to the use of the improved-resolution histo-image 260, the resolution of the reconstructed PET image 264 will be higher than the resolution of a reconstructed PET image that can be acquired directly from the TOF PET data 252.

Figure 5:
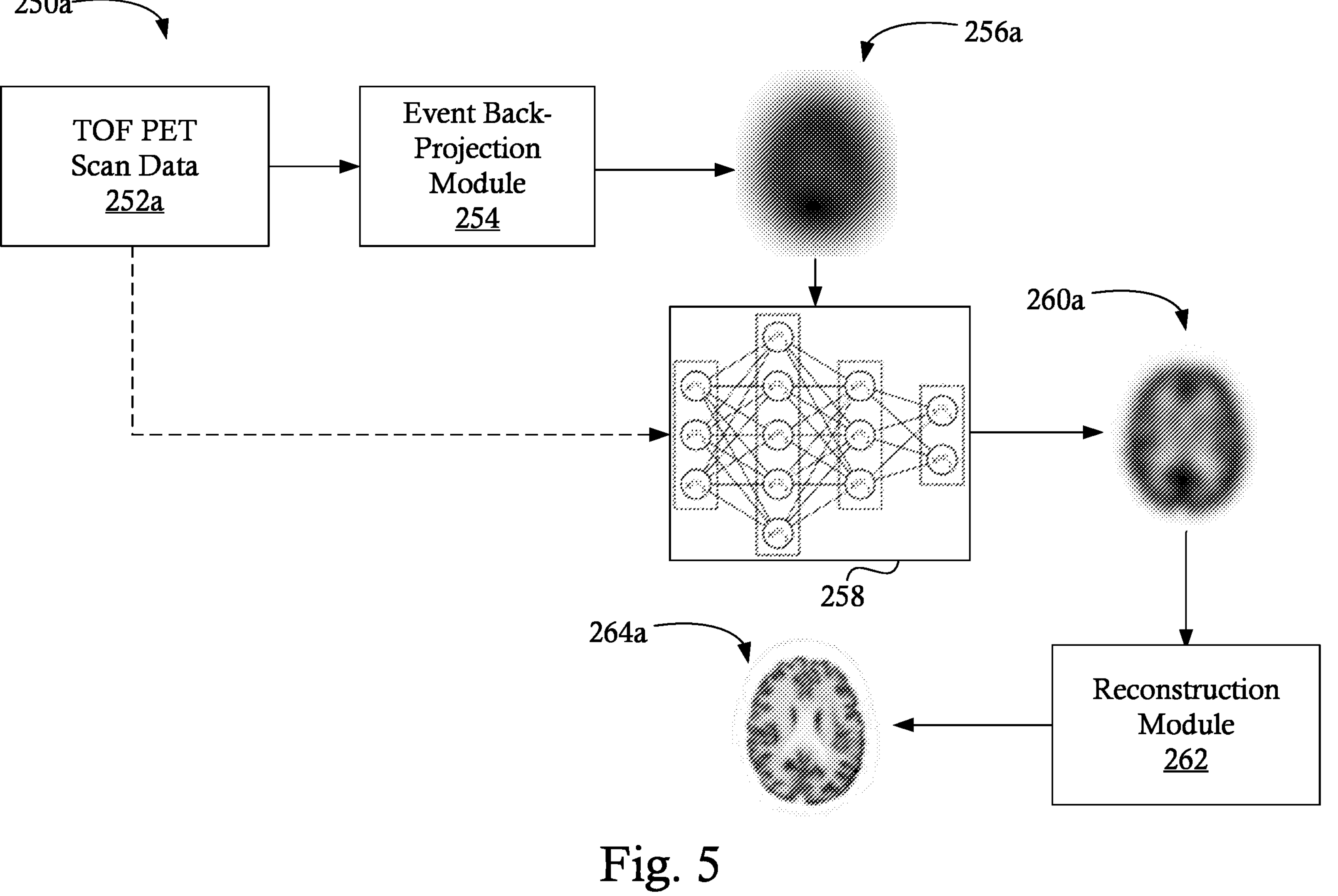
FIG. 5 is a block diagram illustrating a system configured to implement various portions of the method illustrated in FIG. 3 including a 550 ps generated histo-image and a 200 ps improved-resolution histo-image, in accordance with some embodiments.

FIG. 5 illustrates an embodiment of a system 250*a* configured to generate a histo-image 256*a* having a first response time resolution of 550 ps and an improved-resolution histo-image 260*a* having a second effective response time resolution of 200 ps, in accordance with some embodiments. As shown in FIG. 5, the second response time resolution of 200 ps of the improved-resolution histo-image 260*a* provides a significant increase in detail with respect to 550 ps response time resolution of the generated histo-image 256*a*. As illustrated in FIG. 5, the system 250*a* allows low-resolution imaging systems, such as legacy or low-cost PET imaging systems, to provide scan details at resolutions previously available only on higher-cost and/or new machines.

Figure 6:
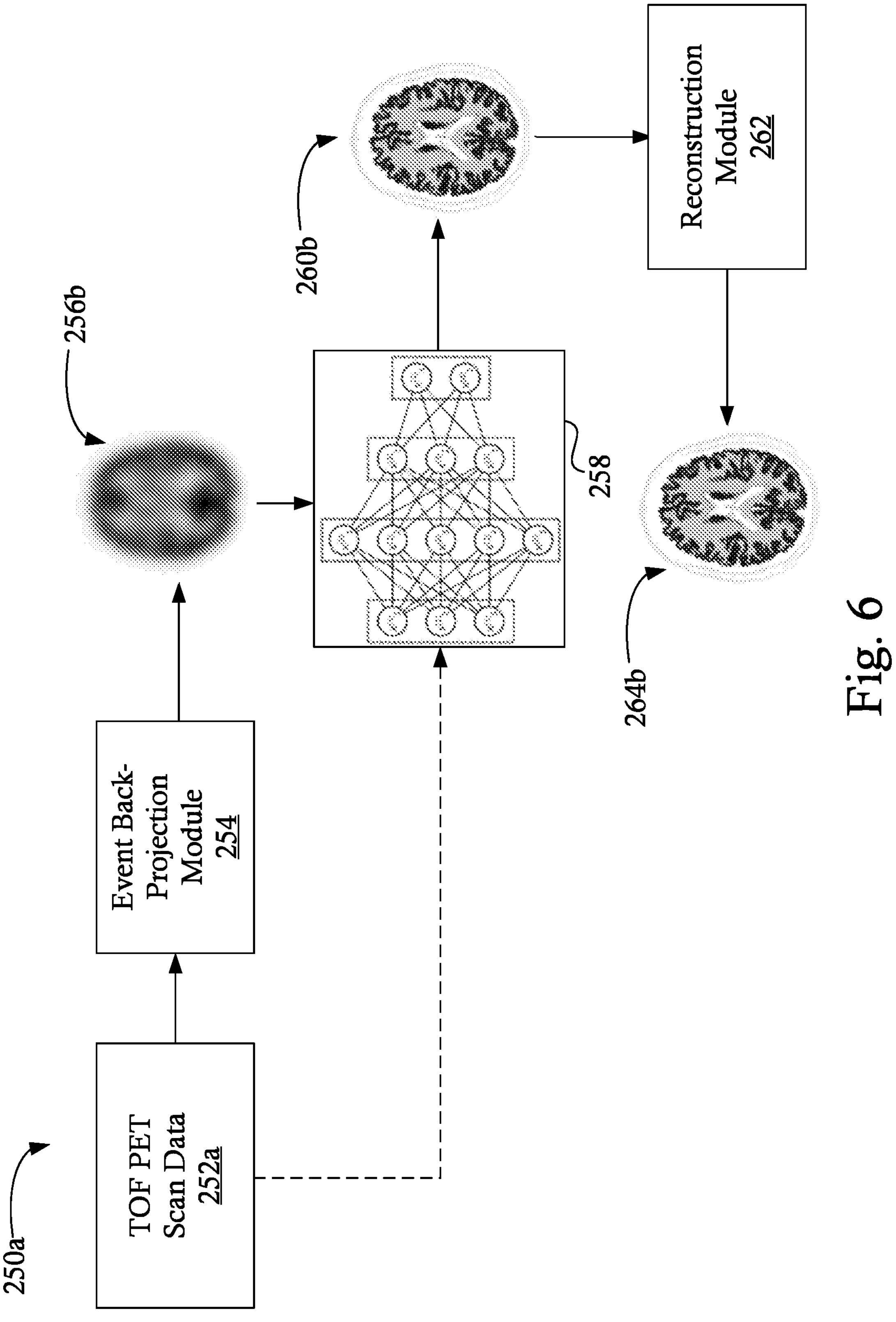
FIG. 6 is a block diagram illustrating a system configured to implement various portions of the method illustrated in FIG. 3 including a 200 ps generated histo-image and a 10 ps improved-resolution histo-image, in accordance with some embodiments.

FIG. 6 illustrates an embodiment of a system 250*b* configured to generate a histo-image 256*b* having a first response time resolution of 200 ps and an improved-resolution histo-image 260*b* having a second effective response time resolution of 10 ps, in accordance with some embodiments. As shown in FIG. 6, the second response time resolution of 10 ps of the improved histo-image 260*b* provides a significant increase in detail with respect to the original 200 ps response time resolution of the generated histo-image 256*b*. In some embodiments, the system 250*b* allows existing PET systems to provide an effective response time resolution not possible on current hardware, such as a second resolution of 10 ps, 1 ps, and/or any other super-high resolution.

Figure 7:
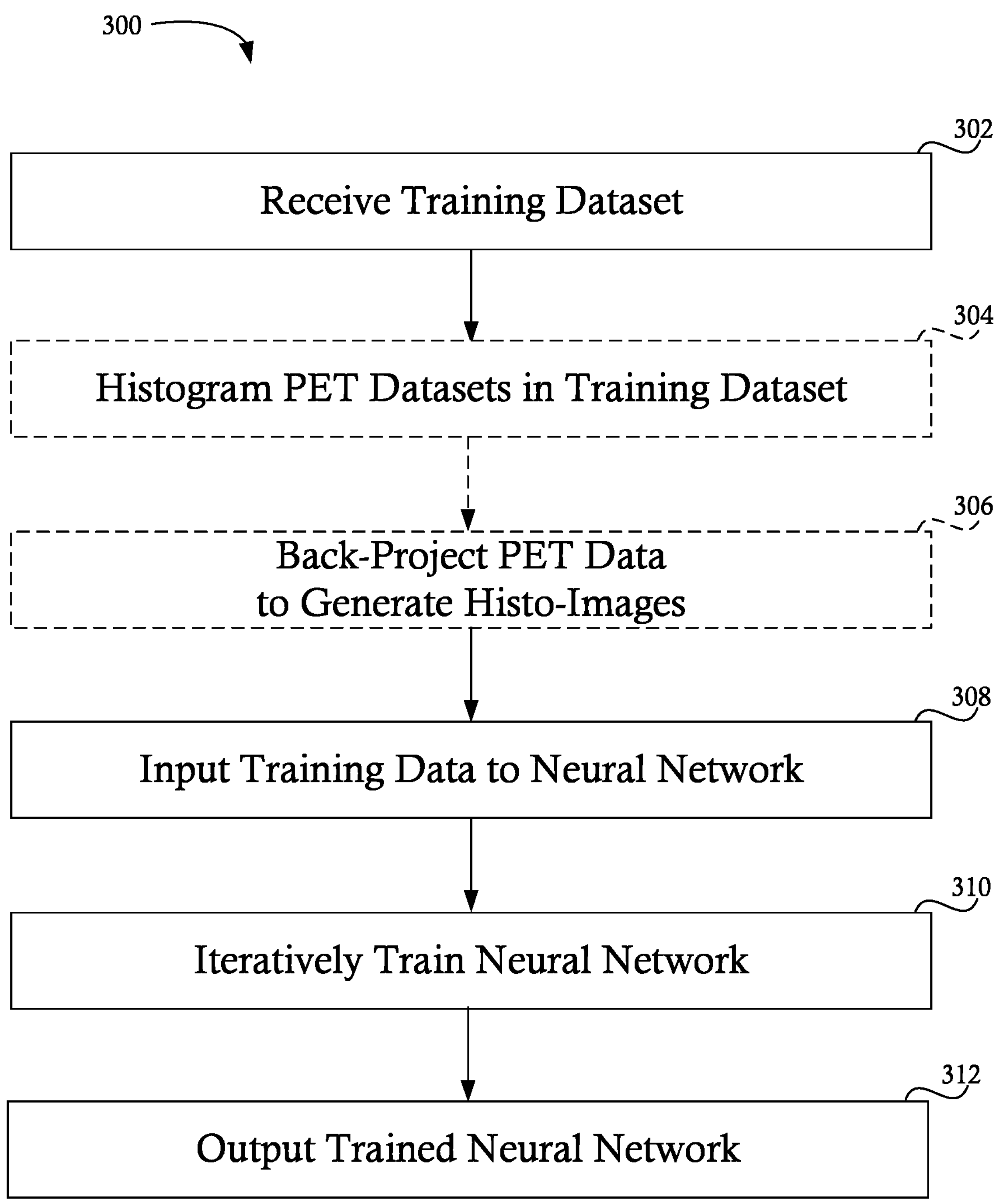
FIG. 7 is a flowchart illustrating a method of training a neural network, in accordance with various embodiments.
Figure 8:
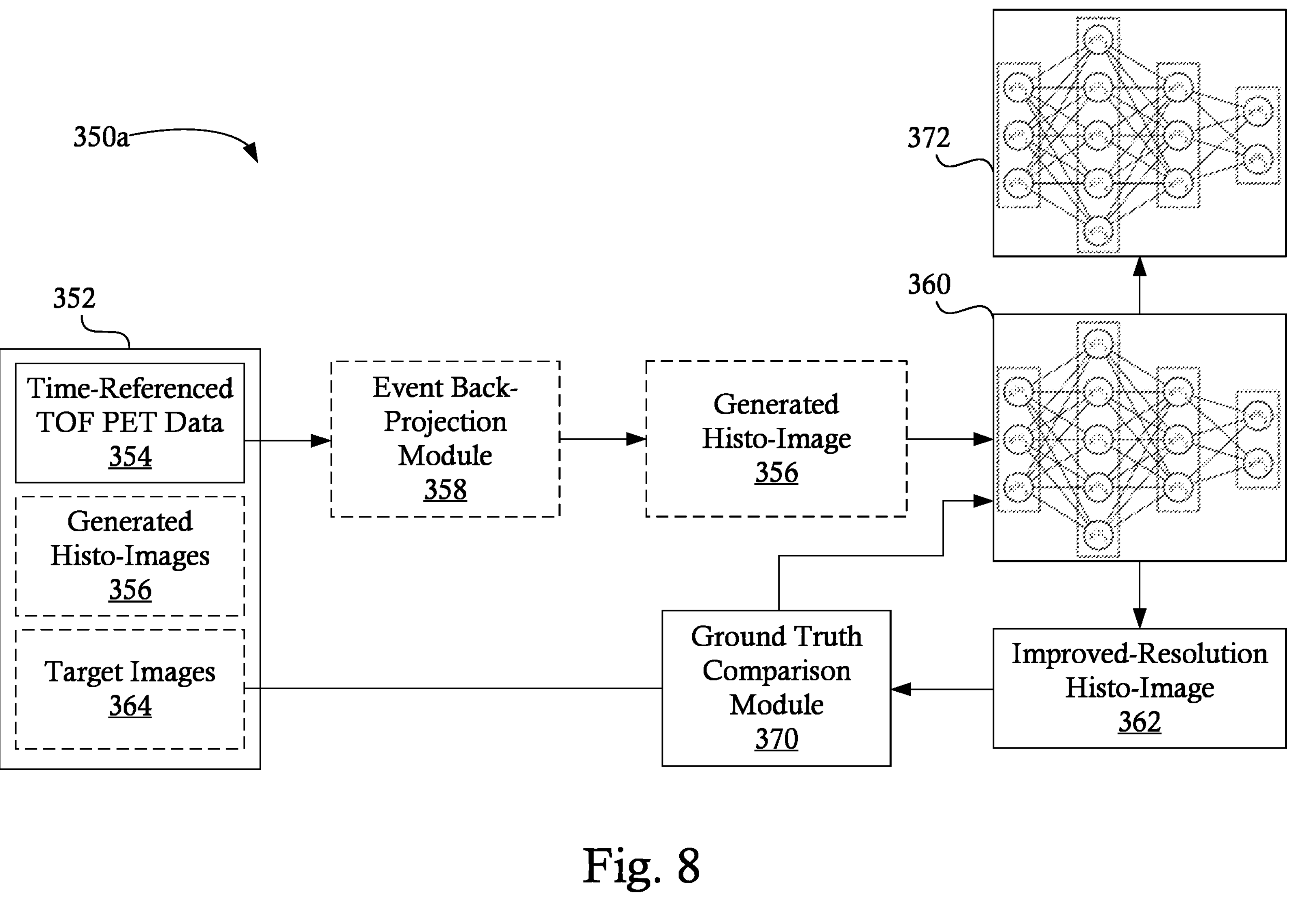
FIG. 8 is a process flow illustrating various steps of the method of training a neural network illustrated in FIG. 7, in accordance with some embodiments.

FIG. 7 is a flowchart 300 illustrating a method of training a neural network, in accordance with various embodiments. FIG. 8 is a process flow 350 illustrating various steps of the method of training a neural network illustrated in FIG. 7, in accordance with some embodiments. The method illustrated in FIG. 7 may be used to train any of the neural networks discussed herein, such as, for example, neural networks 258-258*b*, although it will be appreciated that the method of training a neural network may be configured to train any suitable neural network.

At step 302, a training dataset 352 is acquired. The training dataset 352 may include any suitable type of training data, such as, for example, TOF PET datasets 354 and/or pre-generated histo-images 356. The TOF PET datasets 354 may include PET acquisitions of list-mode data and/or may include PET sinograms generated from TOF PET list-mode data. The TOF PET datasets 354 and/or the pre-generated histo-images 356 have a first response time resolution. The training dataset 352 may include data that is acquired from a repository of PET datasets, such as a training data database or other non-transitory storage mechanism. The training dataset 352 and/or each of the plurality of TOF PET datasets may depict any type of volumes and may have been acquired using any number of PET scanners and PET acquisition settings. In some embodiments, the acquired PET datasets are associated with a same volume (e.g., anatomical or metabolic region), PET scanner and PET acquisition parameters as will be imaged/utilized using a trained neural network.

At optional step 304, each TOF PET dataset 354 can be histogrammed into a plurality of sinograms and, at optional step 306, each TOF PET dataset 354 and/or the plurality of sinograms can be back-projected by an event back-projection module 358 into image space to generate a histo-image 356 corresponding to the TOF PET dataset 354. The TOF back-projection may be performed at step 306 using any suitable method, such as, for example, Joseph's method. In some embodiments, optional step 306 is omitted and the training dataset 352 includes pre-generated histo-images 356. If the training dataset 352 includes pre-generated histo-images 356, the training dataset 352 may also omit raw PET data, such as list-mode PET data and/or TOF sinograms. Each of the generated histo-images 356 has a first response time resolution. In some embodiments, the response time resolution of each of the generated histo-images 356 is similar (e.g., each of the histo-images has a response time of about 200 ps, of about 215 ps, of about 550 ps, of about 600 ps, etc.). In some embodiments, the resolution of the generated histo-images 356 varies within a predetermined range (e.g., each of the histo-images has a response time resolution above about 350 ps, in a range of about 100 ps to about 350 ps, etc.).

At step 308, each histo-image 356 is input into an untrained and/or partially trained neural network 360 configured to generate an improved-resolution histo-image 362 having an effective second response time resolution. That is, the neural network 360 may generate an improved-resolution histo-image 362 based on each input histo-image 356. The improved-resolution histo-image 362 has an effective second response time resolution that is higher (e.g., faster) than the first response time resolution of the histo-image 356. In some embodiments, the target effective response time resolution of each improved-resolution histo-image 362 generated by the neural network 360 is substantially the same (e.g., having an effective resolution response time of about 200 ps, of about 10 ps, etc.). In some embodiments, the resolution of the improved-resolution histo-image 362 is related to the resolution of the input histo-image 356 (e.g., an input histo-image 356 having a first response time resolution of about 600 ps will result in an improved-resolution histo-image having an effective second response time resolution of about 200 ps, an input histo-image 356 having a first response time resolution of about 200 ps will result in an improved-resolution histo-image having an effective second response time resolution of about 10 ps, etc.). The effective second response time resolution of the improved-resolution histo-image 362 is based on the response time resolution of target images used to train the neural network 360, as discussed below.

In some embodiments, the training dataset 352 includes a set of target images 364. The set of target images 364 includes at least one target histo-image associated with each of the TOF PET datasets 354 and/or generated histo-images 356. In some embodiments, the set of target images 364 includes target histo-images generated from the same subject volume as used to generate a corresponding TOF PET dataset 354, but generated using a higher-performance scanner (e.g., a scanner capable of producing a higher (e.g. faster) response time resolution). For example, in some embodiments, a first scan using a first PET scanner may be performed on a subject volume to generate a first TOF PET dataset having a first response time resolution. A second scan, using a second PET scanner, is performed prior to, simultaneously, and/or after the first scan on the subject volume to generate a second TOF PET dataset having a second, higher response time resolution. A generated histo-image 356 is generated from the first TOF PET dataset and at least one target histo-image 364 is generated from the second TOF PET dataset. In some embodiments, the resolution of the target histo-image 364 generated from the second TOF PET dataset is equal to a desired resolution of an improved-resolution histo-image 362 to be generated by the neural network 360.

In some embodiments, the TOF PET datasets 354 and/or the set of target images 364 include simulated data generated by one or more simulation processes. For example, subject volume histo-images (e.g., subject volume representative data in image space) may be simulated based on a Monte Carlo simulation performed at two or more TOF resolutions, such as a first response time resolution equal to an expected resolution of a TOF PET dataset 252 to be received by a trained neural network 258 and a second, higher response time resolution equal to a desired resolution of improved-resolution histo-images 260 to be generated by a trained neural network 258, as discussed above. The Monte Carlo simulation may use any suitable simulation mechanism, such as, for example, Geant4, GATE (Geant4 Application for Tomographic Emission), Graphical Processing Unit (GPU)-based Monte Carlo simulation, or any Monte Carlo based method available. The TOF PET data simulated at the first resolution is used to generate the generated histo-image 356 and the TOF PET data simulated at the second resolution is used to generate the corresponding target image 364.

At step 310, the neural network 360 is trained (e.g., iteratively modified) based on differences between the generated improved-resolution histo-image 362 and a target image 364. For example, in some embodiments, a comparison module 370 is configured to compare an associated target histo-image 364 with the output improved-resolution histo-image 362 to determine differences between each improved-resolution histo-image 362 and the target image 364 and provide modification values to the neural network 360 based on the differences. Although embodiments are illustrated with a separate comparison module 370, it will be appreciated that many neural network models are configured to perform ground truth comparison internally during a training process. The method iteratively repeats steps 308 and 310 until the neural network 360 produces an output within an acceptable range (e.g., generating an improved-resolution histo-image 362 within a certain percentage error with respect to the target histo-image 364).

The iterative training process illustrated in FIGS. 7-8 may utilize any suitable neural network training that is or becomes known. For example, a system configured to implement the iterative training process illustrated in FIGS. 7-8 may determine a loss based on a comparison between k output improved-resolution histo-images 362 generated by the neural network 360 and corresponding ones of target histo-images 364. The loss may comprise an L1 loss, and L2 loss, or any other suitable measure of total loss. An L1 loss is the sum of the absolute differences between each output image and its corresponding ground truth PET image, and an L2 loss is the sum of the squared differences between each output image and its corresponding ground truth PET image. In some embodiments, a training process similar to that described above in conjunction with FIG. 2 may be employed.

At step 310, the determined loss is back-propagated to the neural network 360, which changes its internal weights, or kernel parameter values, based on the back-propagated loss. Steps 308-310 may repeat until it is determined that the loss has reached an acceptable level or training otherwise terminates. At termination, the neural network 360 may be considered trained and, at step 312, a trained neural network 372 is output for use in one or more methods, such as those described in conjunction with FIGS. 3-4.

Figure 9:
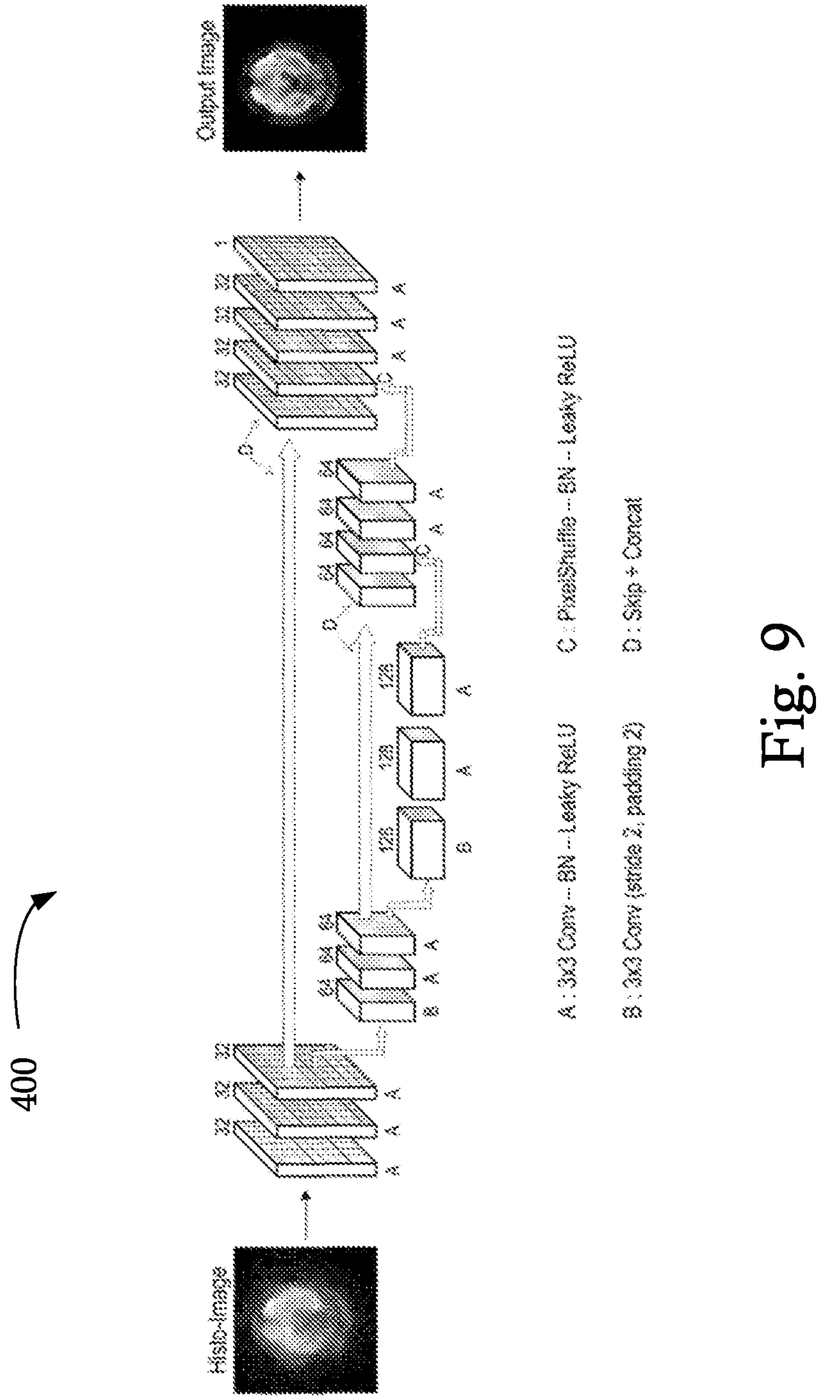
FIG. 9 illustrates neural network architecture, in accordance with some embodiments.

The neural networks described herein may be implemented using any neural network architecture that is or becomes known. For example, as discussed above, FIG. 2 illustrates a neural network architecture 100 that may be implemented in some embodiments. Similarly, FIG. 9 illustrates neural network architecture 400 according to some embodiments. Architecture 400 is similar to a U-NET architecture but is fully convolutional. Specifically, the pooling of the U-Net architecture has been replaced with strided convolution and "up-convolution" has been replaced with the PixelShuffle up-sampling method. Embodiments are not limited to the specific elements of architecture 400.

According to some embodiments, training is performed at steps 308 and 310 using the Adam optimizer to minimize a balanced combination of mean absolute error (MAE) and multi-scale structural similarity difference (SSIM Δ) between a target image $x^{i*}$ and an output image $x_i=F_r(y_i)$. A corresponding loss function is shown below.

$$MAE = \frac{1}{p}\sum_{i=0}^{p1}|x_i - x_i^*|$$

$$SSIM\Delta = 1 - \frac{(2\mu_x^* + \mu_x + c_1)(2\sigma_x^* + \sigma_x + c_2)}{(\mu_x^{*2} + \mu_x{}^2 + c_1)(\sigma_x^{*2} + \sigma_x{}^2 + c_1)}$$

$$\alpha = \frac{\sum_{j=1}^{i+n-1} MAE_j}{\sum_{j=1}^{i+n-1} MAE_j + \sum_{j=1}^{i+n-1} SSIM\Delta_j}$$

$$\text{Loss} = (1-\alpha)MAE + \alpha SSIM\Delta$$

The above loss function dynamically balances the minimization of the absolute error between each corresponding pixel (i.e., MAE) and the perceptual loss function (SSIM), which evaluates the mean μ, variance σ2 and covariance σ between the images. A running average of n samples of each loss type is used to calculate a balancing loss scalar α at each training step.

Figure 10:
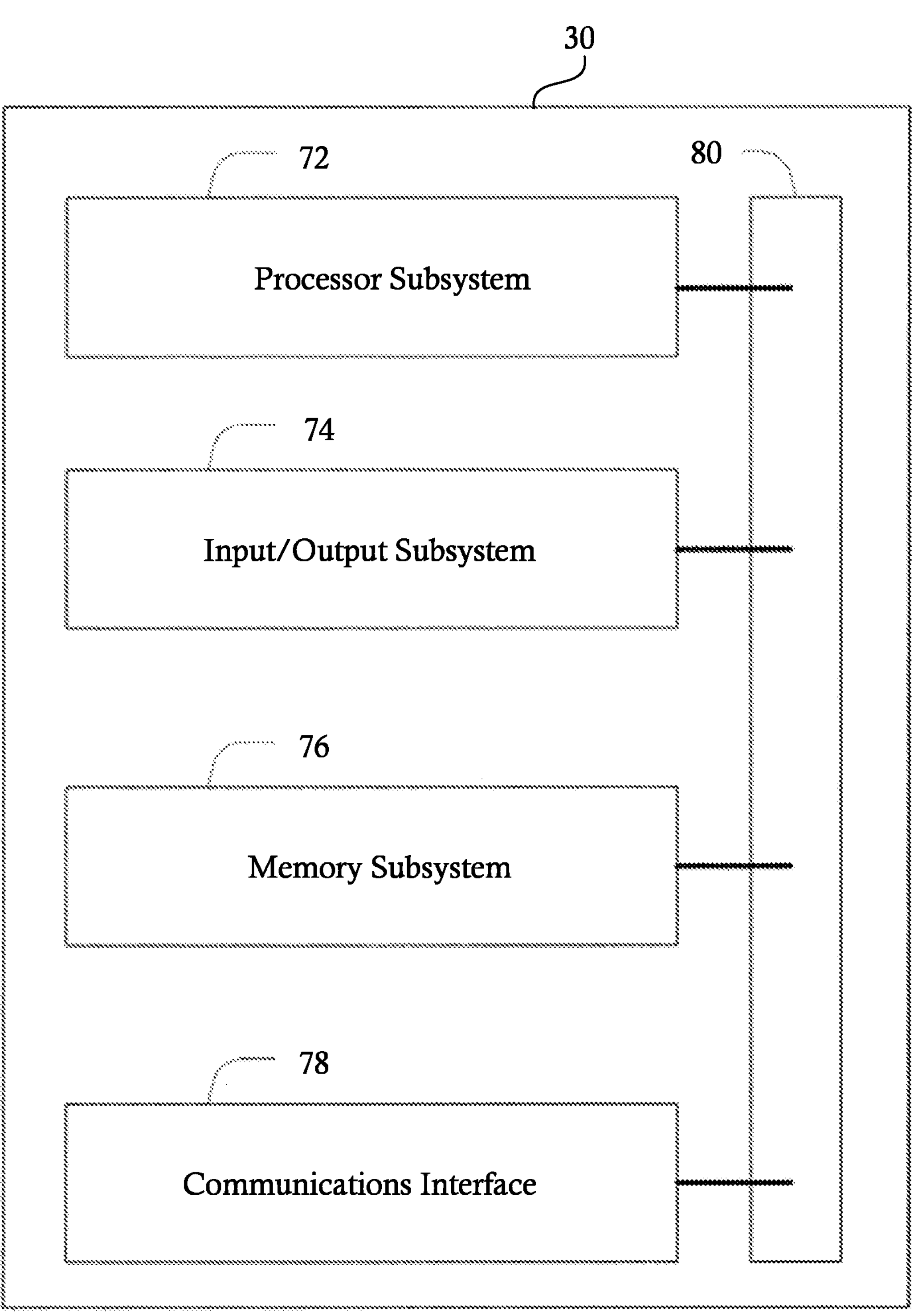
FIG. 10 illustrates a computer system configured to implement one or more processes, in accordance with some embodiments.

FIG. 10 illustrates a computer system 30 configured to implement one or more processes, in accordance with some embodiments. The system 30 is a representative device and can include a processor subsystem 72, an input/output subsystem 74, a memory subsystem 76, a communications interface 78, and a system bus 80. In some embodiments, one or more than one of the system 30 components can be combined or omitted such as, for example, not including an input/output subsystem 74. In some embodiments, the system 30 can comprise other components not shown in FIG. 12. For example, the system 30 can also include, for example, a power subsystem. In other embodiments, the system 30 can include several instances of a component shown in FIG. 12. For example, the system 30 can include multiple memory subsystems 76. For the sake of conciseness and clarity, and not limitation, one of each component is shown in FIG. 12.

The processor subsystem 72 can include any processing circuitry operative to control the operations and performance of the system 30. In various aspects, the processor subsystem 72 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 72 also can be implemented by a controller, a microcontroller, an application specific integrated circuit (ASIC), a field programmable gate array (FPGA), a programmable logic device (PLD), and so forth.

In various aspects, the processor subsystem 72 can be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 30 can include a system bus 80 that couples various system components including the processing subsystem 72, the input/output subsystem 74, and the memory subsystem 76. The system bus 80 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 74 can include any suitable mechanism or component to enable a user to provide input to system 30 and the system 30 to provide output to the user. For example, the input/output subsystem 74 can include any suitable input mechanism, including but not limited to, a button, keypad, keyboard, click wheel, touch screen, motion sensor, microphone, camera, etc.

In some embodiments, the input/output subsystem 74 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 30. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 72. For example, the visual peripheral output device can be able to play media playback information, application screens for application implemented on the system 30, information regarding ongoing communications operations, information regarding incoming communications requests, or device operation screens, to name only a few.

In some embodiments, the communications interface 78 can include any suitable hardware, software, or combination of hardware and software that is capable of coupling the system 30 to one or more networks and/or additional devices. The communications interface 78 can be arranged to operate with any suitable technique for controlling information signals using a desired set of communications protocols, services or operating procedures. The communications interface 78 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 78 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 78 can include a wireless interface comprising one or more antennas, transmitters, receivers, transceivers, amplifiers, filters, control logic, and so forth.

In various aspects, the communications interface 78 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 76.

In some embodiments, the memory subsystem 76 can include any machine-readable or computer-readable media capable of storing data, including both volatile/non-volatile memory and removable/non-removable memory. The memory subsystem 76 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 30.

In various aspects, the memory subsystem 76 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 76 can contain an instruction set, in the form of a file for executing various methods, such as methods including generating improved-resolution histo-images using trained neural networks, as described herein. The instruction set can be stored in any acceptable form of machine readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 72.

Each functional component described herein may be implemented in computer hardware, in program code, and/or in one or more computing systems executing such program code as is known in the art. As discussed above with respect to FIGS. 1 and 12, such a computing system may include one or more processing units which execute processor-executable program code stored in a memory system. Similarly, each of the disclosed methods and other processes described herein may be executed using any suitable combination of hardware and software. Software program code embodying these processes may be stored by any non-transitory tangible medium, as discussed above with respect to FIGS. 1 and 12.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:

a positron emission tomography (PET) imaging modality configured to execute a first scan to acquire a first PET dataset at a first response time resolution; and a processor configured to:

back-project the first PET dataset to generate a first histo-image that represents the first PET dataset and having the first response time resolution;

input the first histo-image to a trained neural network;

receive a second histo-image from the trained neural network, wherein the second histo-image has an effective second response time resolution, wherein the effective second response time resolution is higher than the first response time resolution and higher than otherwise possible for the PET imaging modality, and wherein the second histo-image represents a higher response time resolution version of the first PET dataset; and input the second histo-image to a reconstruction process configured to generate a reconstructed PET image.

2. The system of claim 1, wherein the first response time resolution is in a range of 550 to 650 ps and the second effective response time resolution is in a range of 150 to 250 ps.

3. The system of claim 1, wherein the first response time resolution is in a range of 185 to 215 ps and the second effective response time resolution is in a range of 9 to 11 ps.

4. The system of claim 1, wherein the trained neural network is a trained convolutional neural network.

5. The system of claim 1, wherein the first PET dataset is selected from the group consisting of: a list-mode dataset, a sinogram dataset, and a histo-image dataset.

6. The system of claim 1, wherein the trained neural network is generated by a training dataset comprising a first plurality of first histo-images having the first response time resolution and a plurality of second histo-images having the effective second response time resolution, wherein each of the histo-images in the plurality of first histo-images has at least one corresponding histo-image in the plurality of second histo-images, and wherein the effective second response time resolution of each histo-image in the plurality of second histo-images is higher than the first response time resolution of the at least one corresponding histo-image in the plurality of first histo-images.

7. The system of claim 6, wherein the plurality of first histo-images correspond to a first set of PET data obtained at a first imaging resolution and the plurality of second histo-images correspond to a second set of PET data obtained at a second imaging resolution.

8. The system of claim 6, wherein the plurality of first histo-images comprise a first plurality of simulated histo-images generated at a first simulated resolution and the plurality of second histo-images comprises a second plurality of simulated histo-images generated at a second simulated resolution.

9. The system of claim 8, wherein the first plurality of simulated histo-images and the second plurality of simulated histo-images are generated by a Monte Carlo based simulation.

10. A method of generating reconstructed positron emission tomography (PET) images, comprising:

executing a first scan to acquire a first PET dataset;

back-projecting the first PET dataset to generate a first histo-image that represents the first PET data and having a first response time resolution;

inputting the first histo-image to a trained neural network;

receiving a second histo-image from the trained neural network, wherein the second histo-image has an effective second response time resolution, wherein the effective second response time resolution is higher than the first response time resolution, and wherein the second histo-image represents a higher response time resolution version of the first PET dataset; and inputting the second histo-image to a reconstruction process configured to generate a reconstructed PET image.

11. The method of claim 10, wherein the first response time resolution is in a range of 550 to 650 ps and the effective second response time resolution is in a range of 150 to 250 ps.

12. The method of claim 10, wherein the first response time resolution is in a range of 185 to 215 ps and the effective second response time resolution is in a range of 9 to 11 ps.

13. The method of claim 10, wherein the trained neural network is a trained convolutional neural network.

14. The method of claim 10, wherein the first PET dataset is a list-mode dataset.

15. The method of claim 10, wherein the trained neural network is generated by a training dataset comprising a first plurality of histo-images having the first response time resolution and a second plurality of histo-images having the effective second response time resolution, wherein each of the histo-images in the first plurality of histo-images has at least one corresponding histo-image in the second plurality of histo-images, and wherein the effective second response time resolution of each histo-image in the second plurality of histo-images is higher than the first response time resolution of the at least one corresponding histo-image in the first plurality of histo-images.

16. The method of claim 10, wherein the first plurality of histo-images correspond to a first set of PET data obtained at a first imaging resolution and the second plurality of histo-images correspond to a second set of PET data obtained at a second imaging resolution.

17. The method of claim 10, wherein the first plurality of histo-images comprise a first plurality of simulated histo-images generated at a first simulated resolution and the second plurality of histo-images comprises a second plurality of simulated histo-images generated at a second simulated resolution.

18. The method of claim 17, wherein the first plurality of simulated histo-images and the second plurality of simulated histo-images are generated by a Monte Carlo based simulation.

19. A method of training a neural network to generate higher-resolution histo-images, comprising:

receiving a training dataset comprising a first plurality of histo-images having a first response time resolution and a second plurality of histo-images having a second response time resolution, wherein each of the histo-images in the first plurality of histo-images has at least one corresponding histo-image in the second plurality of histo-images, and wherein the second response time resolution of each histo-image in the second plurality of histo-images is higher than the first response time resolution of the corresponding histo-image in the first plurality of histo-images;

inputting each histo-image in the first plurality of histo-images to a neural network configured to generate a corresponding higher-resolution histo-image having an effective second response time resolution;

comparing each of the higher-resolution histo-images to the at least one corresponding histo-image in the second plurality of histo-images to determine any differences between each higher-resolution histo-image and the at least one corresponding histo-image in the second plurality of histo-images; and modifying the neural network based on the determined differences between each higher-resolution histo-image and the at least one corresponding histo-image in the second plurality of histo-images.

20. The method of claim 19, wherein the first plurality of histo-images and the second plurality of histo-images are simulated histo-images.

* * * * *